Aug. 11, 1936.  P. C. KEITH, JR  2,050,847
PROCESS OF TREATING HYDROCARBON OILS
Filed Jan. 17, 1934
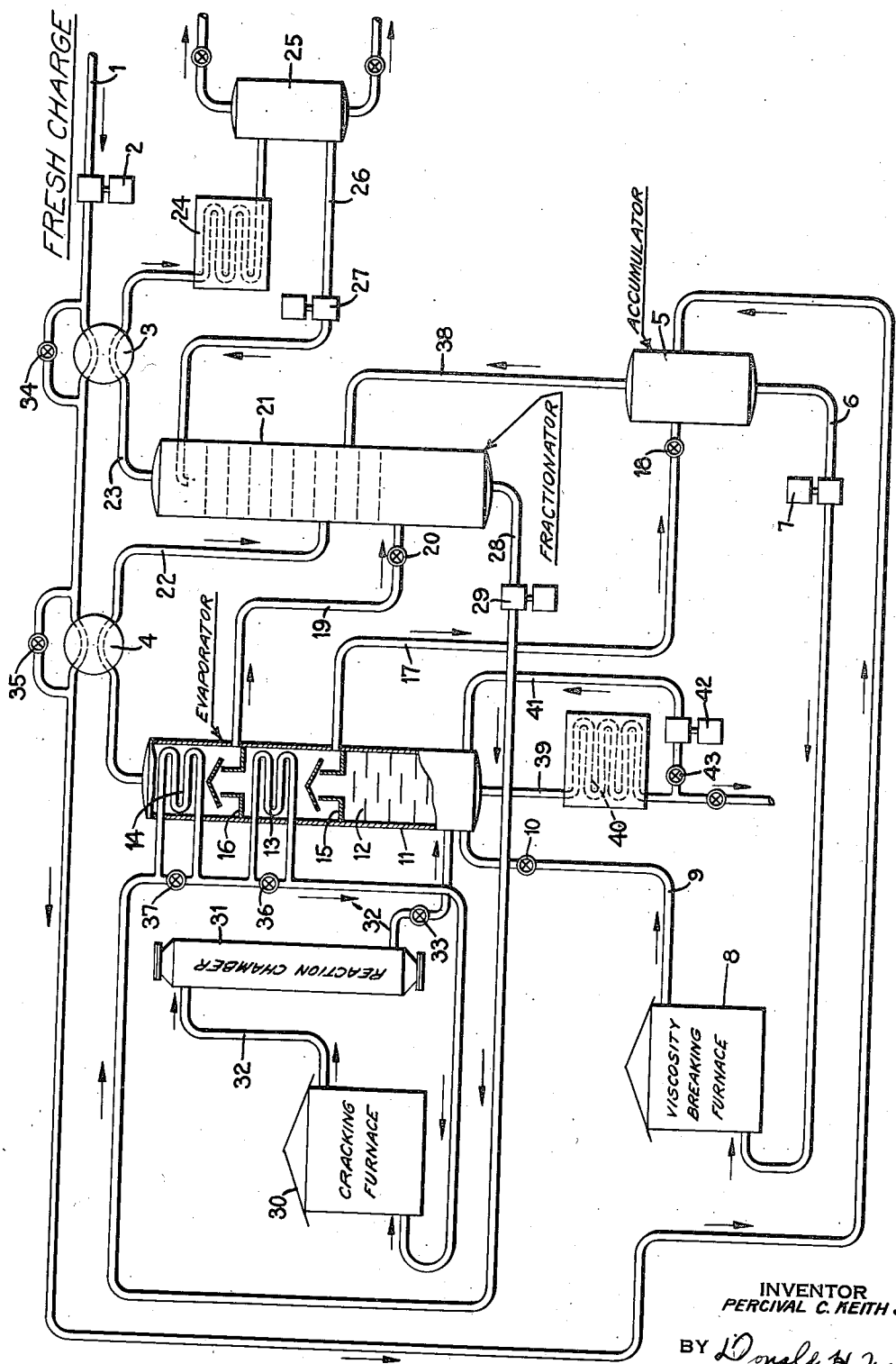
INVENTOR
PERCIVAL C. KEITH JR.
BY Donald H. Mace
ATTORNEY Patented Aug. 11, 1936

2,050,847

UNITED STATES PATENT OFFICE 2,050,847

PROCESS OF TREATING HYDROCARBON OILS

Percival C. Keith, Jr., Peapack, N. J., assignor to Gasoline Products Company, Inc., Newark, N. J., a corporation of Delaware Application January 17, 1934, Serial No. 706,913

4 Claims. (Cl. 196—48)

This invention relates to processes for the treatment of hydrocarbon oils, more particularly to processes for forming relatively light low boiling oil, such as gasoline, from heavier higher boiling point oil.

It is an object of my invention to provide a process whereby a heavy relatively dirty charging stock is subjected to a relatively light cracking operation and introduced into a common evaporating zone along with a more highly cracked, relatively clean, charging stock, the lightly cracked and more highly cracked products mingling in a heated condition in the evaporating zone and being separated therein into vapors and a liquid residue, two condensates being formed in the evaporator, one of a heavy nature which is mingled with preheated relatively heavy fresh charging stock and subjected to the relatively light cracking operation, and a second cleaner condensate of a lighter nature which is withdrawn from the evaporator and passed into a fractionating zone, into which vapors from the evaporator are also passed for fractionation, the reflux condensate from the fractionator serving as a clean charging stock for the process and vapors of the desired boiling characteristics being removed from the top of the fractionator in the usual manner, as a desired product.

In accordance with my invention clean charging stock is subjected to a relatively large amount of cracking to products in the gasoline boiling range, per pass, for example 15% to 20% per pass, under relatively high temperature and pressure, and the resulting cracked products are separated into vapors and a liquid residue in an evaporator. Resulting vapors are partially fractionated in the evaporator to form a heavy condensate and an intermediate condensate, and the fractionated vapors are passed to a fractionator wherein final fractionation takes place.

The resulting fractionated vapors, representing products of the desired boiling range for the final product, are withdrawn and condensed.

The heavy and intermediate condensates are separately withdrawn from the evaporator and the latter is introduced into the base of the fractionator with the reflux condensate collecting therein, the mixture being withdrawn and utilized as the clean charging stock mentioned hereinbefore. The heavy condensate from the evaporator is combined with fresh relatively heavy charging stock, preferably previously preheated, and passed through a viscosity breaking cracking zone, wherein it is subjected to a relatively small amount of cracking, and the resulting cracked products are introduced into the evaporator, for treatment similar to that described in connection with the clean charging stock. The fresh relatively heavy charging stock is preferably preheated by indirect heat exchange with vapors separated in the fractionator and the evaporator prior to being combined with the heavy condensate from the evaporator. Likewise the mixture of intermediate condensate and reflux condensate withdrawn from the fractionator and constituting the relatively clean charging stock is preferably preheated, prior to being passed through the cracking furnace, by passage in indirect heat exchange with the vapors in the evaporator, thereby serving to form the reflux condensates, which are withdrawn from the evaporator.

The above mentioned and other objects and advantages of my invention, and the manner of attaining them, will be made clear in the following description and accompanying drawing.

Referring more particularly to the drawing, reference numeral 1 indicates a charging line through which fresh relatively heavy charging stock such as crude oil, topped crude, or the like, is forced by pump 2, this oil passing through heat exchangers 3 and 4 into accumulator or mixing tank 5. Liquid oil is withdrawn from the accumulator 5 through pipe 6 and forced by pump 7 through the coils of viscosity breaking furnace 8, from which it may emerge at a temperature of from 800° to 900° F., for example, about 850° F. and under a pressure preferably about 225 pounds per square inch, although this pressure may vary considerably, for example, from a few pounds to 400 pounds per square inch or more. It is generally desirable, however, to operate considerably below the 400 pound value in order to prevent the deposition of large amounts of coke.

The amount of conversion to lighter products, taking place in the heater 8, is preferably kept relatively low, amounting, for example, to 12% to 13% of products in the gasoline boiling range, per pass through the heater. The resulting cracked products pass from the viscosity breaking furnace 8 through transfer line 9 having pressure reducing valve 10 into evaporator 11, wherein separation of vapors from liquid takes place, the vapors passing upwardly by baffle plates or other contacting elements 12, and cooling coils 13 and 14 which serve to form condensates that are collected on trap-out trays 15 and 16 respectively. The reflux condensate collected on tray 15 is of a heavier nature and higher boiling point than that collected on tray 16, and is withdrawn from the evaporator and passed to the accumulator 5 through pipe 17, having control valve 18. The lighter lower boiling condensate, of a nature suitable for use in the clean cracking stock, is removed from the trap-out tray 16 and is transferred through line 19 having control valve 20, into the base of the fractionator or bubble tower 21. Vapors remaining uncondensed pass off from the top of the evaporator through vapor line 22 into an intermediate point in the fractionator 21 and are subjected to fractionation therein in the usual manner. The fractionated vapors of desired boiling characteristics pass off from the top of the fractionator through vapor line 23 and heat exchanger 3, wherein they are partially cooled, final condensation being accomplished in the condenser 24 and the resulting condensate e. g. gasoline, being collected in the receiving drum 25. Reference numeral 26 indicates a pump back line through which the final distillate may be forced back into the top of the fractionator by action of pump 27, in quantities sufficient to provide the necessary cooling, in the usual manner. Reflux condensate formed in the fractionator 21 collects in the base thereof in mixture with the condensate introduced through line 19, the mixture being drawn off as a clean composite charging stock, through line 28, and forced by action of pump 29 through heat exchange coils 14 and 13, countercurrent to the flow of vapors through the evaporator, and then into the heating coils of cracking furnace 30, wherein it is subjected to moderately high cracking temperature and pressure.

The temperature of the oil emerging from the cracking furnace is preferably about 900° F. and the pressure preferably of a relatively high value, for example about 750 pounds per square inch, although somewhat higher or lower temperature and/or pressure may be used. The temperature may range, for example, from 850° F. to 1100° F., while the pressure may be several hundred pounds higher or lower than that mentioned as preferred, the values selected depending largely upon the character of the charging stock and the particular final product which it is desired to produce. The cracking to products in the gasoline boiling range, per pass, is preferably considerably higher than that taking place in the viscosity breaking furnace 8, and may be, for example, in the neighborhood of 18% to 20%, although the value may be higher or lower than that mentioned, depending upon the character of the charging stock and the particular condition selected for operation. The major portion of the cracking preferably takes place in reaction chamber 31 into which the highly heated cracked products from the furnace 30 are introduced, through transfer line 32, only a part of the cracking being effected in the heater 30, although the proportion of cracking in the heater with respect to that taking place in the reaction chamber may be altered as desired by varying the time of passage of the oil through the heater and the temberature to which it is subjected therein, or the reaction chamber may be eliminated from the system.

From the reaction chamber the cracked and digested products are passed through pipe 32, having reducing valve 33, into the evaporator 11, wherein they commingle with the products introduced through line 9 and are also separated into vapors and liquid residue, the vapors being treated as already described in connection with the cracked products introduced through the pipe 9. The condensate withdrawn from the tray 15 in the evaporator 11 and introduced into the accumulator 5 is preferably so heavy and relatively dirty that it is not suitable for passage through the cracking furnace 30, while the condensate withdrawn from the trap-out tray 16 is sufficiently clean and light in nature to be suitable for cracking in the furnace 30, being in the nature of a clean cracking stock.

Reference numerals 34, 25, 36 and 37 indicate control valves for by-passing and desired amount of oil around the heat exchangers 3, 4, 13 and 14, respectively. Reference numeral 38 indicates a vent line for conducting any vapors which may form in the accumulator 5 into the fractionator 21. This vent line may be omitted if desired.

*Operation*

In operation, fresh relatively heavy charging stock, such as crude oil, topped crude, heavy fuel oil or the like, for example topped crude of about 22° A. P. I. gravity from the Mid-Continent field, is introduced through charging line 1 and passed wholly or in part through indirect heat exchangers 3 and 4 wherein the fresh charge is heated and at the same time necessary cooling is provided for the process. The preheated charging stock then passes into the accumulator tank 5 in mixture with heavy condensate introduced into the same tank through pipe 17. The mixture of condensate and fresh charge is withdrawn from the accumulator and passed as a composite heavy charging stock through the viscosity breaking furnace 8, from which it may emerge at a temperature falling in the range of 800° to 900° F., suitably about 850° F., under a pressure which may vary considerably, e. g., from a few pounds per square inch to several hundred pounds per square inch, preferably about 200 pounds per square inch. The total amount of cracking of the heavy products passed through the furnace may be from 8% to 15% of products in the gasoline boiling range, per pass, preferably about 12% to 13%. If desired a portion of this cracking or substantially all of it may be carried out in a reaction chamber (not shown) in the well known manner, this reaction chamber being located between the viscosity breaking furnace and the evaporator and being operated under substantially the same conditions of temperature and pressure as the cracking furnace. The resulting cracked products are introduced into the evaporator 11, which may be operated at substantially the same or a somewhat lower pressure than that of the viscosity breaking furnace. It is generally satisfactory to operate this evaporator at substantially the same pressure as that of the viscosity breaking furnace, this pressure being, for example, about 200 pounds per square inch. In the evaporator vapors separate from liquid residue, the latter being removed through the draw-off line 39 and the cooler 40 to storage. A portion of the cooled liquid may be returned to the evaporator by way of line 41 under pressure created by pump 42, the desired control being effected by valve 43. By circulating cooled liquid in this manner the temperature in the base of the evaporator can be kept below a coking value thereby insuring a greater length of run and preventing stoppage of the draw-off line. This temperature is preferably kept under about 830° F.

Vapors pass upwardly through the evaporator around the baffle plates 12 and cooling coils 13 and 14, the latter serving to remove heavier constituents from the rising vapors, the vapors remaining uncondensed and passing over through pipe 22 to the fractionator 21 containing no constituents which are too heavy for cracking in the cracking furnace 30. A heavy condensate is collected on the trap-out tray 15, which is not suitable for passage through the coils of cracking furnace 30, having, for example, a gravity of about 15° to 18° A. P. I., but is adapted for treatment in the viscosity breaking furnace 8. This condensate is passed into the accumulator 5 by way of conduit 17. A lighter, cleaner condensate is collected on trap-out tray 16, this condensate being suitable for cracking in the furnace 30, having, for example, a gravity of about 18° to 22° A. P. I. and a carbon content preferably not in excess of .2% by the Conradson test. This condensate is introduced into the base of the fractionator 21 and therein commingled with reflux condensate condensed from the vapors introduced into the pipe 22 and rising through the fractionator. These vapors are subjected to fractionation in the usual well known manner, the boiling characteristics of the fractionated vapors being determined by the amount of cooling liquid pumped back through line 26, or in any other well known manner. Fractionated vapors pass overhead through line 23 and condenser 24, the final distillate being collected in receiver 25. This distillate has the end-point desired for the final product, e. g. gasoline.

The reflux condensate and condensate introduced through line 19, collected at the base of the fractionator, constitute a composite clean charging stock for passage through the cracking furnace 30, and is of a nature suitable for a relatively large amount of cracking per pass without deleterious carbon formation. This composite stock may have a gravity of about 20° to 25° A. P. I. and a color of about 3 N. P. A., for example, as well as a relatively low carbon content, of preferably not over .1% by the Conradson test. From this it can be seen that the greater the amount of condensate removed from trap-out tray 16 and transferred to the base of the fractionator the cleaner and lighter this stock must be. On the other hand if the quantity of light condensate passed from the trap-out tray 16 to the fractionator is reduced then the quality of this condensate may be lowered, the gravity being somewhat lower and the color and carbon content being somewhat less favorable, the character of the composite charging stock being brought to the desired standard by the admixed reflux condensate formed in the fractionator. The heavier condensate withdrawn from trap-out tray 15 may be considerably heavier and dirtier than that collected on the trap-out tray 16, being much too dirty for cracking in the furnace 30, but being suitable for the formation of added clean cracking stock by passage through the viscosity breaking furnace 8, wherein the amount of cracking per pass and attendant carbon formation is relatively low. The clean composite charging stock is removed from the base of the fractionator 21 and passed through heat exchange coils 14 and 13 preferably countercurrent to the vapors rising through the coils of the evaporator, then through the coils of cracking furnace 30, from which the oil may emerge at a temperature of, for example, 850° to 1000° F., preferably about 900° F., under a pressure of, for example, from 200 to 1000 pounds per square inch, preferably about 750 pounds per square inch, thereafter being introduced into the reaction chamber 31, a considerable portion of the cracking taking place in the furnace 53 or not, as desired. In the reaction chamber 31 further conversion occurs, the total amount of cracking being preferably as great as possible without deleterious coking. The cracking to products in the gasoline boiling range, per pass, may range from 15% to 40% for example, depending upon the character of the stock being treated, but is preferably in the neighborhood of 18% to 20% per pass. The highly heated cracked products are then introduced through pipe 32' into the lower part of evaporator 11, with attendant reduction of pressure by action of valve 33, sufficient to cause vaporization of a large portion of the cracked products. The resulting vapors separate from the residual liquid, both vapors and liquids being treated as outlined hereinbefore in connection with the products from the viscosity breaking furnace 8.

The character of the condensate collected on trap-out trays 15 and 16 may be regulated as desired by adjusting the amount of cooling fluid, that is, the amount of composite charging stock passing through the coils 13 and 14, the necessary control being effected by means of valves 36 and 37.

While I have described a particular embodiment of my invention for the purposes of illustration, it should be understood that various modifications and adaptations thereof may be made within the spirit of the invention as set forth in the appended claims.

I claim:

1. The process of treating hydrocarbon oil which comprises passing fresh relatively heavy charging oil through a first cracking zone wherein it is raised to a cracking temperature and subjected to a relatively small amount of cracking per pass, under relatively low pressure, introducing the resulting cracked products into an evaporating zone wherein vapors are separated from liquid residue, passing said vapors upwardly through said evaporating zone and simultaneously subjecting them to fractional condensation to form a relatively heavy condensate and an intermediate condensate, passing vapors remaining uncondensed into a separate fractionating zone wherein these vapors are subjected to further fractional condensation, removing vapors remaining uncondensed, from said fractionating zone, combining said heavy condensate with said fresh relatively heavy charging stock prior to the passage thereof through said first cracking zone, introducing said intermediate condensate into said fractionating zone to mingle with the condensate formed therein, removing the commingled condensates from said fractionating zone and passing them in indirect heat exchange with the vapors in said evaporating zone to aid in the fractional condensation thereof to form said relatively heavy condensate and said intermediate condensate, then passing the heated commingled condensates through a second cracking zone wherein they are raised to a cracking temperature and subjected to a relatively large amount of cracking per pass under relatively high pressure, and introducing the resulting cracked products into said evaporating zone.

2. A process in accordance with claim 1 wherein said fresh relatively heavy charging stock is preheated prior to passage through the first mentioned heating zone, by indirect heat exchange with the vapors withdrawn from the fractionating zone and with the vapors withdrawn from the evaporating zone.

3. A process in accordance with claim 1 wherein the cracking per pass of the oil passing through the first mentioned heating zone is about 8 to 10% and wherein the cracking per pass of the oil in the second mentioned heating zone is about 18 to 20%.

4. A process in accordance with claim 1 wherein the cracking per pass into desired low boiling products of the oil passing through the first mentioned heating zone is not above about 13% and wherein the cracking per pass into desired low boiling products of the oil in the second mentioned heating zone is above about 15%.

PERCIVAL C. KEITH, Jr.